United States Patent [19]

Matsumoto

[11] Patent Number: 5,486,885
[45] Date of Patent: Jan. 23, 1996

[54] CHARACTER IMAGE DISPLAY APPARATUS FOR A CAMERA

[76] Inventor: Fumiharu Matsumoto, 4-802, 31, 1-chome, Hon-cho, Nakano-Ku, Tokyo, Japan

[21] Appl. No.: 206,878

[22] Filed: Mar. 7, 1994

[30] Foreign Application Priority Data

Mar. 5, 1993 [JP] Japan .................. 5-014623 U

[51] Int. Cl.⁶ .................................................. G03B 17/24
[52] U.S. Cl. .................................................. 354/106
[58] Field of Search ........................ 354/105–109

[56] References Cited

U.S. PATENT DOCUMENTS

| | | | |
|---|---|---|---|
| 1,336,330 | 4/1920 | Zuckeman | 354/108 |
| 3,971,049 | 7/1976 | Ohmori et al. | 354/105 |
| 4,104,658 | 8/1978 | Uchiyama et al. | 354/106 |

*Primary Examiner*—David M. Gray
*Attorney, Agent, or Firm*—Ostrolenk, Faber, Gerb & Soffen

[57] ABSTRACT

A character image display apparatus in a film device with a lens mounted thereon or a camera is constructed such that a hole is provided on a reflector in a flash unit provided on a body of the camera, one end of a photoconductor is fixed to the hole and the other end thereof is connected to a diffusion block disposed so as to face an exposure window on the body, and a display device in which a positive film of a display image such as a character image sticked on a plane of the diffusion block is disposed in front of a film in fixed relationship to a shading corrugation within an exposure portion of the camera body, whereby when photographing is performed, a light ray from the flash unit is introduced by the photoconductor and a display image such as a character mark is simultaneously exposed simultaneously exposed as a part of a photographing image with light rays uniformed by the diffusion block.

6 Claims, 4 Drawing Sheets

CHARACTER IMAGE DISPLAY APPARATUS FOR A CAMERA

BACKGROUND OF THE INVENTION

1. Field of the Invention

The present invention relates to a simplified display apparatus for a camera into which a photographed image and a or the like at a photographing position can be taken simultaneously.

2. Prior Art

In ordinary cameras, various data photographing apparatus capable of simultaneously taking a picture of photographing data or the like together with a photographing image have been developed and put into practise. These apparatus are constructed such that an illumination apparatus for the exclusive use of photographing data for introducing external light onto a camera body or a back lid is mainly provided, or a photographing data is simultaneously taken in a picture together with a photographing image on a film with a data apparatus provided before or behind the film by utilizing exposure light from a photographing lens.

However, since a photographing data is taken in a picture in superposed relationship on a part of a film together with a photographing image, for example, there may be caused a case where the data is not distinctly legible in the finished photograph as in the case where an over-exposed object being photographed is taken in a part of a photographing image on which the data is taken in a picture. Also, in a film device with a lens mounted thereon (camera), its cost is a big problem and its body is provided with an expensive data photographing apparatus, thus it being complicated.

SUMMARY OF THE INVENTION

An object of the present invention is to provide a simplified character image display apparatus for a camera which is capable of clearly photographing a display image, such as a character simultaneously with the image being photographed.

The present invention is a character image display apparatus in a film device with a lens mounted thereon in which a hole is provided on a reflector in a flash unit provided on a body of said film device, one end of a photoconductor is fixed to the hole and the other end thereof is connected to a diffusion block disposed so as to face an exposure window on the body, and a display device in which a positive film of a display image such as a character image sticked on a plane of the diffusion block is disposed in front of a film in fixed relationship to a shading corrngation within an exposure portion of body, whereby when photographing is performed, a light ray from the flash unit is introduced by the light guide and a display image such as a character mark is simultaneously exposed as a part of a photographing image with light rays uniformed by the diffusion block.

In the present invention, an illumination light ray from the flash unit is introduced by the light guide to illuminate a display image such as a character mark with light rays uniformed by a diffusion block and the sidplay image is simultaneously photographed on a film together with a photographing image, resulting in that a display mark such as character mark can be clearly and simultaneously taken in a picture with a simple apparatus composed of only inexpensive members.

DETAILED DESCRIPTION OF THE PREFERRED EMBODIMENT

The present invention will be described hereinafter with reference to the attached drawings.

Figure 1:
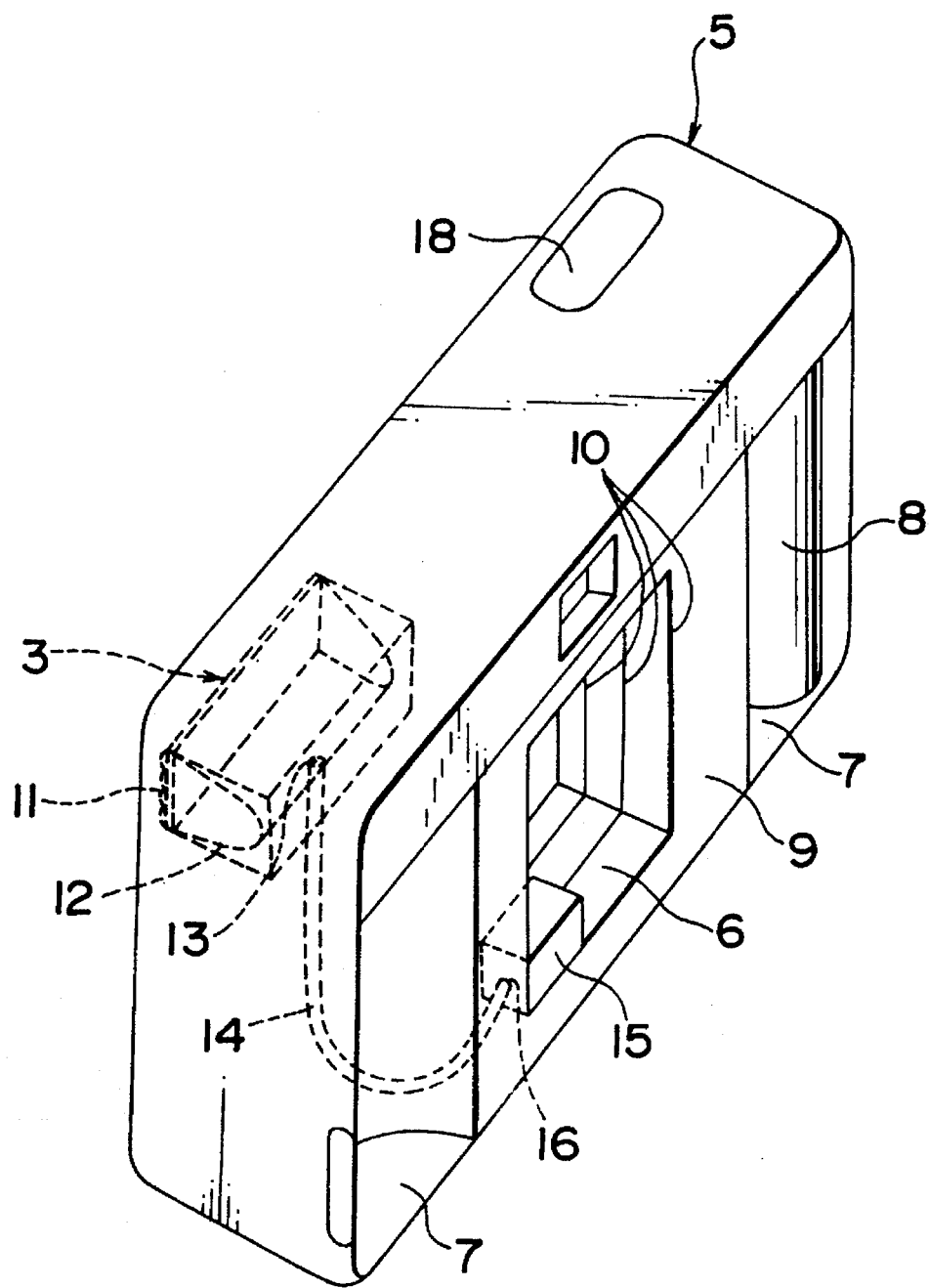
FIG. 1 is a perspective view showing the structure of a character display apparatus of the present invention in a camera.
Figure 2:
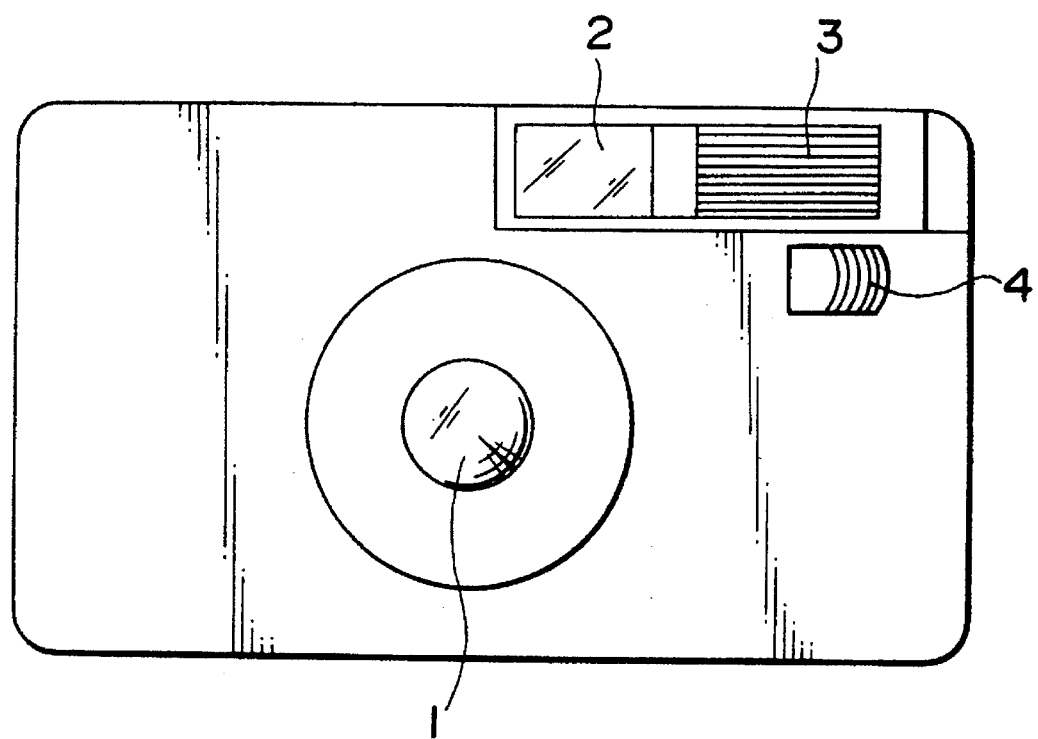
FIG. 2 is a front view of the camera shown in FIG. 1.

FIG. 1 shows the back view of the body of a camera with its back lid removed. FIG. 2 shows the front view thereof. Specifically, the camera has a photographic lens 1 at the center of the camera, a view finder 2 and a flash unit 3 at the upper front thereof, and a button 4 for operating the flash unit. A body 5 of the camera is integrally formed and has an exposure portion 6 extending rearward in a pyramid shape through which light passes at the center of the body 5, and an opening as an exposure window at a film pressing portion 9 is disposed between opposite sides of the body 5 for receiving a film cartridge 8. A plurality of shading corrugations 10 are formed within the exposure portion 6.

The flash unit 3 comprises a diffusion plate 11, a flash bulb (not shown) and a reflector 12. The reflector 12 is provided with a hole 13. One end of a light guide 14 is at hole 13 so that light from the flash bulb can pass through the light guide 14. The light guide 14 is preferably an optical fiber bundle. The other end of the light guide 14 is inserted into a hole 16 of a diffusion block 15 which is fixed to the shading corrugation 10 in the exposure portion 6. The diffusion block 15 has a display plane 15a (FIGS. 3 and 4) disposed so as to be in contact with the film pressing portion 9.

Figure 3:
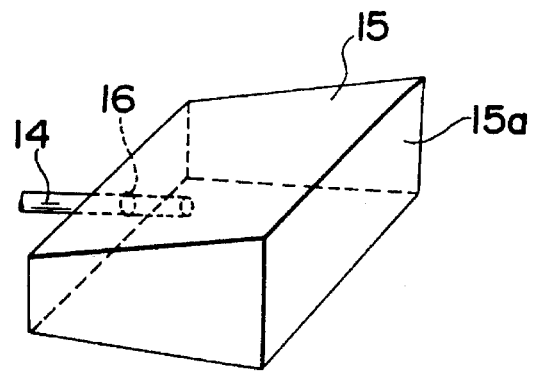
FIG. 3 is a perspective view showing an example of fixing a light guide to a diffusion block.
Figure 4:
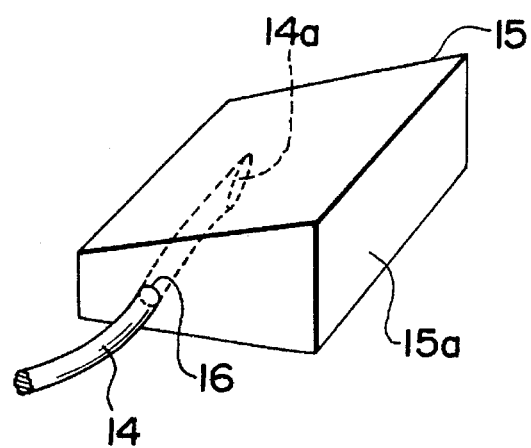
FIG. 4 is a perspective view showing another example of fixing the light guide to the diffusion block.

Referring to FIGS. 3 and 4, the diffusion block 15 receives illumination from light guide 14 which is uniformly distributed over display plane 15a. The tip of the light guide 14 is inserted into the hole 16 of the diffusion block 15 and is disposed perpendicularly to the display plane 15a, as shown in FIG. 3, and is adhesively fixed therein. The tip of light guide 14 ends in a plane that is substantially perpendicular to the longitudinal axis of the light guide 14. Referring to FIG. 4, the light guide 14 is inserted laterally to the display plane 15a, that is, in a direction parallel to display plane 15a, and the tip of the light guide 14 is obliquely cut to have a light dispersion plane 14a facing the display plane 15a.

Figure 5:
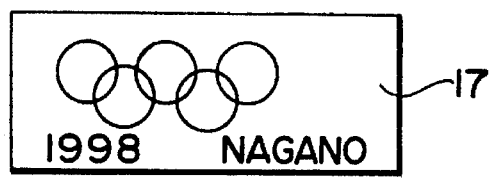
FIG. 5 is a front view of a display mark.

An image on a positive film 17 which is prepared by photographing a character mark or the like as shown in FIG. 5, is adhered to a display plane 15a on the film side of the diffusion block 15. Accordingly, when the shutter 18 is depressed, the flash unit 3 emits light to expose the film and illuminate the image such as a character mark on the display plane 15a with light rays uniformed by the diffusion block 15 by introducing, the light from the flash unit 3 by the light guide 14, thereby a very clear image being simultaneously exposed on a part of an exposure area of the film.

While there is no limitation in size of the diffusion block 15, judging from a taken picture, it is most suitable to dispose the display plane 15a at the four corners within an exposure portion 6 or on the full surface of the lower side within the exposure portion 6. When an exposure value of a display image does not agree with that of a photographing image due to a size of the display plane 15*a* or an image density of a character mark or the like, it is possible to easily make the amounts of exposures equal by increasing a size of the photoconductor 14.

Figure 6A:
FIGS. 6(A) and (B) are front views of finished photographs.
Figure 6B:
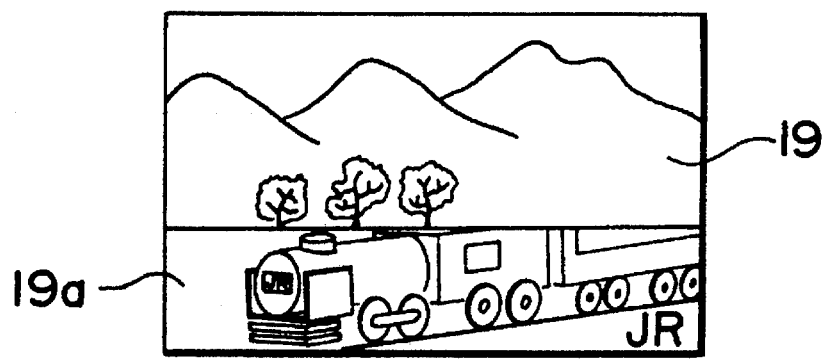

Consequently, a printed photograph is a picture having the clear display image 19*a* such as a character in a part of the exposure image 19, as shown in FIGS. 6 (A) and (B).

As described above, a character display apparatus of the present invention in a camera is composed of very inexpensive light guide and diffusion block on the display plane of which a mark is only sticked. With such a structure, it is possible to simultaneously photograph a very clear display image in a part of an object being photographed together with the latter. Consequently, a photograph adapted to a place of selling films or an event performed in the place can be provided without raising a price of the film device, leading to highly raise a value for a commemorative picture.

What is claimed is:

1. A character image display apparatus for a camera, comprising:

a camera body having a film exposure portion and a film plane;

a flash unit having a reflector for illuminating a subject being photographed, the flash unit being housed on the camera body;

a light guide having an end thereof connected to the reflector through a hole in the reflector, thereby light emitted from the flash unit being transmitted through said light guide;

a diffusion block fixed to the camera body within the exposure portion of the body, the diffusion block having a display plane substantially parallel to the film plane of the camera body, and a positive film of a display image being disposed on said display plane and thereby facing the film plane of the camera body, and an opposite end of the light guide disposed in the diffusion block such that during the photographic process light from the flash unit is introduced through the light guide to the diffusion block to uniformly illuminate the display image and thereby the display image being simultaneously photographed with a subject being photographed.

2. The character image display apparatus of claim 1, wherein said display image is a character image.

3. The character image display apparatus of claim 1, wherein said positive film is adhesively adhered to the display plane of the diffusion block.

4. The character image display apparatus of claim 1, wherein the opposite end of the light guide in the diffusion block has a light dispersion plane which is disposed substantially parallel to the display plane of the diffusion block.

5. The character image display apparatus of claim 4, wherein the light dispersion plane is oblique to the longitudinal axis of the light guide.

6. The character image display apparatus of claim 4, wherein the light dispersion plane is substantially perpendicular to the longitudinal axis of the light guide.

* * * * *